Patented July 7, 1953

2,644,791

UNITED STATES PATENT OFFICE 2,644,791

DRILLING FLUID COMPOSITION

Jan van Heiningen, Amsterdam, Netherlands, assignor to Shell Development Company, San Francisco, Calif., a corporation of Delaware No Drawing. Application October 23, 1950, Serial No. 191,731. In the Netherlands March 16, 1950

7 Claims. (Cl. 252—8.5)

This invention relates to the drilling of oil and gas wells and pertains more particularly to the use and composition of improved oil-containing drilling fluids.

Drilling fluids, commonly known as drilling "muds," are normally used when drilling oil or gas wells by the rotary method. These muds are usually pumped down through the drill stem of the rotary rig and around the drill bit, returning to the surface through the annular passage between the drill stem and the well casing.

An important function of the drilling fluid is to supply a static head sufficient to overcome formation pressures encountered during the drilling operations which tend to blow the drilling fluid from the well borehole. To accomplish the purpose of this function it is generally necessary to weight a drilling fluid with comminuted solid materials, such for example as ground oyster shells, metallic ores, barites, etc.

While a great number of different weighting materials have been successfully employed in normal water-base drilling fluids, most of these same weighting materials are not readily incorporated in oil-base or oil-containing drilling fluids. This is due to the fact that most of the presently known finely ground weighting agents have a greater tendency to be wetted by water than by oil. Thus, when a preferentially water-wettable weighting material is admixed with an oil base fluid or an oil and water emulsion, it has a greater tendency to settle out of the fluid than it does when it is incorporated in a water-base mud.

It is therefore a primary object of the present invention to provide an oil-containing drilling fluid incorporating a preferentially oil-wettable material which imparts extremely low settling characteristics to said fluid.

Another requisite of a satisfactory drilling emulsion or fluid is that it possess good plastering or sheath-forming characteristics. That is, it must form on the walls of the borehole a mud-sheath effectively preventing any appreciable fluid loss to the formation. It is therefore another object of this invention to provide a weighted oil-containing drilling fluid having good plastering characteristics, even at high well temperatures.

These and other objects of this invention will be understood from the following detailed description of the invention. The term "oil-containing drilling fluid" employed herein and in the appended claims, includes water-in-oil or oil-in-water emulsions, wherein either the aqueous or the non-aqueous fluid component may vary in proportions of from one to fifty per cent of the total fluid phase, and oil-base drilling fluids having a base substantially comprising an oil, although it may be noted that these so-called pure oil base drilling fluids normally contain, after a relatively short period of drilling, an amount of emulsified or non-emulsified water, usually formation water, rain water, water from aqueous alkali additives, etc., equal to from one to several per cent of the total fluid phase.

The present invention can be practiced by adding to an oil-containing drilling fluid sufficient quantities of a finely pulverized oil shale to weight the fluid to a predetermined specific gravity. The amount of oil shale to be added naturally depends upon the density of the shale being employed and the desired specific gravity of the drilling fluid being mixed. The density of oil shale may vary from 1.4 to 2.7 depending upon the amount of oil it contains.

By oil shale is understood a sedimentary rock with a relatively high content of organic material, from which hydrocarbons can be produced by destructive distillation, but hardly or not at all by extraction; the ash content is usually greater than 1/3.

Before the oil shale is incorporated in a drilling fluid, it is broken up into fine particles which are then preferably pulverized in a ball mill. The finely ground oil shale may then be added in the necessary quantities to weight the drilling fluid to a predetermined value. Generally, the oil shale, as the weighting material, may constitute a substantial portion of the weight of the drilling fluid, e. g., in the range of 20 to 60 per cent. However, where only light weight muds are needed to overcome low formation pressures, oil shale may be added in quantities as low as 5 per cent by weight of the fluid.

Drilling fluids may comprise several components which commonly include a suspending component or medium, a suspended component, a plastering agent and an emulsifying and/or stabilizing agent. The suspending medium in the case of an emulsion is formed of oil and water, and in the case of an oil-base drilling fluid oil alone is used, although small amounts (e. g., 5%) of water may be present, as stated above. The oil in either case may be in the form of any suitable non-aqueous liquid such as a crude oil, Diesel oil, fuel oil, kerosene, stove oil, gas oil and the like. A plastering agent of a natural or synthetic asphaltic bitumen, or a blown or polymerized asphalt, is commonly incorporated in the drilling fluid to seal the porous walls of the borehole by forming a sheath of mud thereon. In drilling oil and water emulsions, the blown asphalt may be omitted or may be added to the oil phase of an emulsion prior to emulsification in relatively small quantities such as from 5 to 20 per cent on the weight of the oil phase.

In the case of drilling emulsions, 0.5 to 5 per cent of a suitable emulsifying agent is also used, e. g., soaps of fatty acids, rosin acids, tall oil and the like. In general, excellent emulsions may be obtained with most of these soaps when about 1 per cent (by weight) of the emulsifier is used. The monovalent metal salts or soaps of the above-mentioned acids are used when preparing oil-in-water emulsions while the di- or trivalent metal soaps of the acids are employed when mixing water-in-oil emulsions. These and other soaps may also be added to straight oil base fluids to increase their gel properties.

Weighted oil-containing drilling fluids prepared according to the present invention are found to have excellent settling characteristics at all times, even when subjected to high temperatures, whereas oil-containing drilling fluids containing well-known weighting agents, such as barites, exhibit rather high rates of settling especially at high temperatures.

For example, a sample of Colorado oil shale was broken up into small particles which were ground in a ball mill to a finely divided state. The ground oil shale was then added as a weighting material to a sample of oil base drilling fluid comprising fuel oil, blown asphalt, and a stabilizer, such as a magnesium rosin soap. Sufficient quantities of the ground oil shale were added so that the resultant drilling fluid had a specific gravity of 1.23. At the same time, similar amounts of Arizona barite and of California barite containing 3 per cent of admixed yellow ochre were added to two other samples of the same oil base mud. After the three samples of drilling mud had been thoroughly mixed, 16 hour settling tests were carried out at 95° C. and at 150° C. with the following results:

| Sample | Temperature, °C. | Top Settling, Percent | Remarks |
| --- | --- | --- | --- |
| Oil Shale Mud | 95 | 9.0 | Very soft to bottom. |
| Arizona Barite Mud | 95 | 52.0 | Fairly soft to bottom. |
| California Barite Mud | 95 | 59.0 | Do. |
| Oil Shale Mud | 150 | 9.5 | Very soft to bottom. |
| Arizona Barite Mud | 150 | 51.0 | Soft to bottom. |
| California Barite Mud | 150 | 54.0 | Fairly soft to bottom. |

Thus, it may be readily seen that the sample of oil base mud incorporating finely divided oil shale as a weighting agent exhibited settling characteristics which were far superior to the other muds using barites as their weighting agent. Additionally, the oil base mud containing oil shale, as well as those muds containing the barite, all retained their good plastering properties at high temperatures, the filter loss, i. e., loss of the suspending component through the plaster cake formed by the mud, being only 0.25 cc. per sq. cm. in 60 mins. at 275° C. and 500 p. s. i. in all the muds. Also, the gel strength of 14 g. for the oil shale mud after 10 minutes at 20° C. was not significantly different from that of the two muds containing barites which had gel strengths of 20 g. each.

When ten per cent of water was later emulsified in the oil base drilling fluid containing oil shale, there was no appreciable change in the viscosity, settling rate or plastering properties of the fluid. On a further test it was also found that the addition of 15% finely divided oil shale to a heavy (90–100 lbs./cu. ft.) oil base mud inhibits the settling of barite (40%) already contained, in the mud as a weighting agent. At 95° C. the top settling was reduced from 59% to 22% while at 150° C. a reduction of settling from 51% to 19% was observed.

Additionally, it has been found that oil-containing drilling fluids incorporating various types of asphalt exhibit greatly reduced plastering properties when they are used at high temperatures (above about 100° C.). However, with the addition of oil shale to an oil-containing mud the plastering properties thereof remained excellent at 150° C.

*Example*

A drilling fluid A was prepared from 60% gas oil, 10% blown asphalt and 30% finely ground chalk, and a drilling fluid B from 65% gas oil, 10% blown asphalt and 25% ground oil shale. In preparing these fluids, the asphalt was first melted and then mixed with the oil, the ground chalk or the ground oil shale being thereafter added to the mixture.

The filtration loss of these drilling fluids was measured under standard conditions (30 mins.; 7 atm.) at 20° C. and 150° C. The results were as follows:

| Drilling fluid | Filtration loss, cc. | |
| --- | --- | --- |
| | at 20° C. | at 150° C. |
| A | 3.0 | 80 |
| B | 1.0 | 4.0 |

The above experiments clearly show the very good plastering properties of the combination of oil shale and asphalt at a high temperature. Similar results were obtained when oil shale and asphalt polymerized with di-nitro-cresol were applied.

In oil-containing drilling fluids where it is necessary to add a preferentially water-wettable weighting agent in addition to the preferentially oil-wettable oil shale, it may be found advantageous to grind or pulverize the two materials together whereby the normally preferentially water-wettable material is coated by the oil and so acquires the properties of a preferentially oil-wettable material to a high degree.

While, in general, the oil shale should be in a finely ground state when added to an oil-containing drilling mud as a weighting agent, it is often advantageous on special occasions to add oil shale particles of irregular shape having a mean diameter between ⅛ and ¼ of an inch. Thus, when drilling in coarse-grained and porous formations, the particles of oil shale in the drilling fluid act as a plugging material in closing the porous formation whereas small particles of clay or barites would flow into the formation through the interstices, passages and pores between the grains of the formation sands. In using oil shale of this size as a weighting agent, it is often desirable to add to the drilling fluid suitable materials for increasing the gel strength of the suspending fluid and hence maintain the larger particles of shale in a suspended state. As a plugging material, oil shale particles are superior to well-known plugging materials such as oat or cottonseed hulls, wood fibre, etc., in that the oil shale particles are very hard and their structure is not broken down during pumping as is often the case with the softer plugging materials. Additionally, the inclusion of oil shale to a drilling fluid yields a mud sheath having excellent deplastering properties on oil bearing formations while being unaffected by contaminating formation waters.

I claim as my invention:

1. A weighted drilling fluid for use in wells comprising an oil-containing suspending liquid, an oleophilic asphaltic bitumen plastering agent and a preferentially oil-wettable weighting agent consisting of oil shale, said weighting agent being present in quantities of from 5% to 60% of the total weight of the drilling fluid.

2. A weighted drilling fluid for use in wells comprising an oil-containing suspending liquid, an oleophilic asphaltic bitumen plastering agent and a preferentially oil-wettable weighting agent, said weighting agent comprising a finely divided oil shale which constitutes from 5 to 60% of the total weight of the drilling fluid.

3. An oil base drilling fluid for use in wells comprising a substantial quantity of mineral oil, an oleophilic asphaltic bitumen plastering agent and a finely divided solid weighting material dispersed in said oil, said weighting agent comprising an oil shale which constitutes from 5 to 60% of the total weight of the drilling fluid.

4. An oil base drilling fluid for use in wells comprising a substantial quantity of mineral oil, an oleophilic asphaltic bitumen plastering agent and a finely divided solid weighting material dispersed in said oil, said weighting agent comprising a mixture of oil shale and a preferentially water-wettable weighting material which constitutes from 5 to 60% of the total weight of the drilling fluid.

5. An oil base drilling fluid for use in wells comprising a substantial quantity of mineral oil, an oleophilic asphaltic bitumen plastering agent and a finely divided solid weighting material dispersed in said oil, said weighting agent comprising a mixture of oil shale and barites which constitutes from 5 to 60% of the total weight of the drilling fluid.

6. A drilling fluid for use in a well comprising an emulsion of oil and water, an oleophilic asphaltic bitumen plastering agent and a finely divided solid weighting material dispersed in said emulsion, said weighting material consisting essentally of an oil shale having a density in the range of 1.4 to 2.7 and constituting from 5 to 60% of the total weight of the drilling fluid.

7. A drilling fluid for use in a well comprising an emulsion of mineral oil and water, an emulsifying agent, an oil soluble plastering agent, and a finely divided weighting agent of oil shale having a density in the range of from 1.4 to 2.7, said weighting agent being present in quantities of from 5% to 60% of the total weight of the drilling fluid.

JAN van HEININGEN.

References Cited in the file of this patent

UNITED STATES PATENTS

| Number | Name | Date |
|---|---|---|
| 2,241,225 | Garrison | May 6, 1941 |
| 2,315,995 | Williams | Apr. 6, 1943 |
| 2,350,154 | Dawson | May 30, 1944 |
| 2,509,588 | Dawson | May 30, 1950 |

FOREIGN PATENTS

| Number | Country | Date |
|---|---|---|
| 803,828 | France | Oct. 9, 1936 |